US011899162B2

(12) United States Patent
Crumpton et al.

(10) Patent No.: US 11,899,162 B2
(45) Date of Patent: Feb. 13, 2024

(54) METHOD AND SYSTEM FOR RESERVOIR SIMULATIONS BASED ON AN AREA OF INTEREST

(71) Applicant: SAUDI ARABIAN OIL COMPANY, Dhahran (SA)

(72) Inventors: Paul Crumpton, Dhahran (SA); Michel Cancelliere, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 738 days.

(21) Appl. No.: 17/019,921

(22) Filed: Sep. 14, 2020

(65) Prior Publication Data
US 2022/0082728 A1 Mar. 17, 2022

(51) Int. Cl.
*G01V 99/00* (2009.01)
*G06F 30/20* (2020.01)
(Continued)

(52) U.S. Cl.
CPC ............ *G01V 99/005* (2013.01); *E21B 49/00* (2013.01); *G01F 1/00* (2013.01); *G06F 30/20* (2020.01);
(Continued)

(58) Field of Classification Search
CPC ............ G01V 99/005; G01V 2210/663; G06F 30/20; G06F 2113/08; G06F 2111/10;
(Continued)

(56) References Cited

U.S. PATENT DOCUMENTS 9,260,947 B2 2/2016 Lu et al.
2013/0035913 A1 2/2013 Mishev et al.
(Continued)

FOREIGN PATENT DOCUMENTS

WO WO-2013119245 A1 * 8/2013 ........... G01V 99/005

OTHER PUBLICATIONS

Guion, Alexandre Nicolas, et al. "Validation of a non-uniform coarsening and upscaling framework." SPE Reservoir Simulation Conference. OnePetro, 2019. pp. 1-24. (Year: 2019).*
(Continued)

*Primary Examiner* — John E Johansen
(74) *Attorney, Agent, or Firm* — Osha Bergman Watanabe & Burton LLP

(57) ABSTRACT

A method may include obtaining a selection of various user-defined coarsening parameters. The user-defined coarsening parameters may include a predetermined fine-grid region in a geological region of interest and a predetermined cell distance. The method may further include determining an area of interest (AOI) mask for the geological region of interest based on the predetermined fine-grid region. The method may further include determining a geological property mask based on the user-defined coarsening parameters. The geological property mask may correspond to a predetermined geological feature within the predetermined cell distance from the AOI mask. The method may further include generating a coarsened grid model using grid model data and well data for the geological region of interest. The method may further include performing a reservoir simulation of the geological region of interest using the coarsened grid model.

17 Claims, 10 Drawing Sheets

Property Resolution 390: Fine-Grid > Coarsening Level A > Coarsening Level B > Coarsening Level C

(51) Int. Cl.
*E21B 49/00* (2006.01)
*G01F 1/00* (2022.01)
*G06F 113/08* (2020.01)
*G06F 111/10* (2020.01)
*E21B 47/07* (2012.01)
*E21B 47/06* (2012.01)
*E21B 43/00* (2006.01)

(52) U.S. Cl.
CPC .............. *E21B 43/00* (2013.01); *E21B 47/06* (2013.01); *E21B 47/07* (2020.05); *E21B 2200/20* (2020.05); *G01V 2210/663* (2013.01); *G06F 2111/10* (2020.01); *G06F 2113/08* (2020.01)

(58) Field of Classification Search
CPC ...... E21B 49/00; E21B 2200/20; E21B 47/07; E21B 43/00; E21B 47/06; G01F 1/00
USPC .......................................................... 703/10
See application file for complete search history.

(56) References Cited

U.S. PATENT DOCUMENTS

2013/0311158 A1  11/2013 Dasari
2020/0226311 A1* 7/2020 Ding ................... G01V 99/005

OTHER PUBLICATIONS

International Search Report and Written Opinion issued in Application No. PCT/US2021/050065, dated Jan. 7, 2022 (16 pages).
"Local grid refinement and coarsening", Eclipse Technical Description, Schlumberger, Ch. 39, 2017, pp. 460-498 (39 pages).
Debaun, D. et al., "An Extensible Architecture for Next Generation Scalable Parallel Reservoir Simulation", SPE 93274, Society of Petroleum Engineers, Inc., Jan. 2005 (13 pages).
Cheshire, Ian M. et al., "An Efficient Fully Implicit Simulator", EUR 179, European Offshore Petroleum Conference & Exhibition, Oct. 1980 (12 pages).
King, M.J. et al., "Optimal Coarsening of 3D Reservoir Models for Flow Simulation", SPE 95759, Society of Petroleum Engineers, Oct. 2005 (15 pages).
Henriquez, Adolfo et al., "Novel Simulation Techniques Used in a Gas Reservoir With a Think Oil Zone: Troll Field", SPE Reservoir Engineering, Society of Petroleum Engineers, Nov. 1992, pp. 414-418 (5 pages).
Fung, Larry S.K. and Ali H. Dogru, "Distributed Unstructured Grid Infrastructure for Complex Reservoir Simulation", SPE 113906, Society of Petroleum Engineers, Jun. 2008 (9 pages).
Li, D. and B. Beckner, "Optimal Uplayering for Scaleup of Multimillion-Cell Geologic Models", SPE 62927, Society of Petroleum Engineers Inc., Oct. 2000 (16 pages).
Dogru, Ali H. et al., "A Next-Generation Parallel Reservoir Simulator for Giant Reservoirs", SPE 119272, Society of Petroleum Engineers, Feb. 2009 (29 pages).
Crumpton, P.I. et al., "Multilateral-Complex Well Optimization", SPE 140882, Society of Petroleum Engineers, Feb. 2011 (12 pages).
Dogru, Ali H. et al., "New Frontiers in Large Scale Reservoir Simulation", SPE 142297, Society of Petroleum Engineers, Feb. 2011 (12 pages).
Dzyuba, V.I. et al., "Application of sector modeling technolgy for giant reservoir simulations", SPE 162090, Society of Petroleum Engineers, Oct. 2012 (10 pages).
Lin, Binghuai et al., "Field-Scale Assisted History Matching Using a Systematic, Massively Parallel Ensemble Kalman Smoother Procedure", SPE-182617-MS, Society of Petroleum Engineers, Feb. 2017 (16 pages).
Lin, Binghuai et al., "Parallel Implementation of Ensemble Kalman Smoother for Field-Scale Assisted History Matching", SPE-183755-MS, Society of Petroleum Engineers, Mar. 2017 (11 pages).
Middya, Usuf and Paul Crumpton, "Compact Stacked Contour Applied to Full Field Simulation Lifecycle", SPE-193871-MS, Society of Petroleum Engineers, Apr. 2019 (7 pages).
Middya, Usuf et al., "Optimization Based Well Management for Coupling Giant Reservoir Models", SPE-193920-MS, Society of Petroleum Engineers, Apr. 2019 (10 pages).
Oliphant, T.E. "Python for Scientific Computing", Computing in Science & Engineering; 2007; pp. 10-20 (11 pages).

* cited by examiner

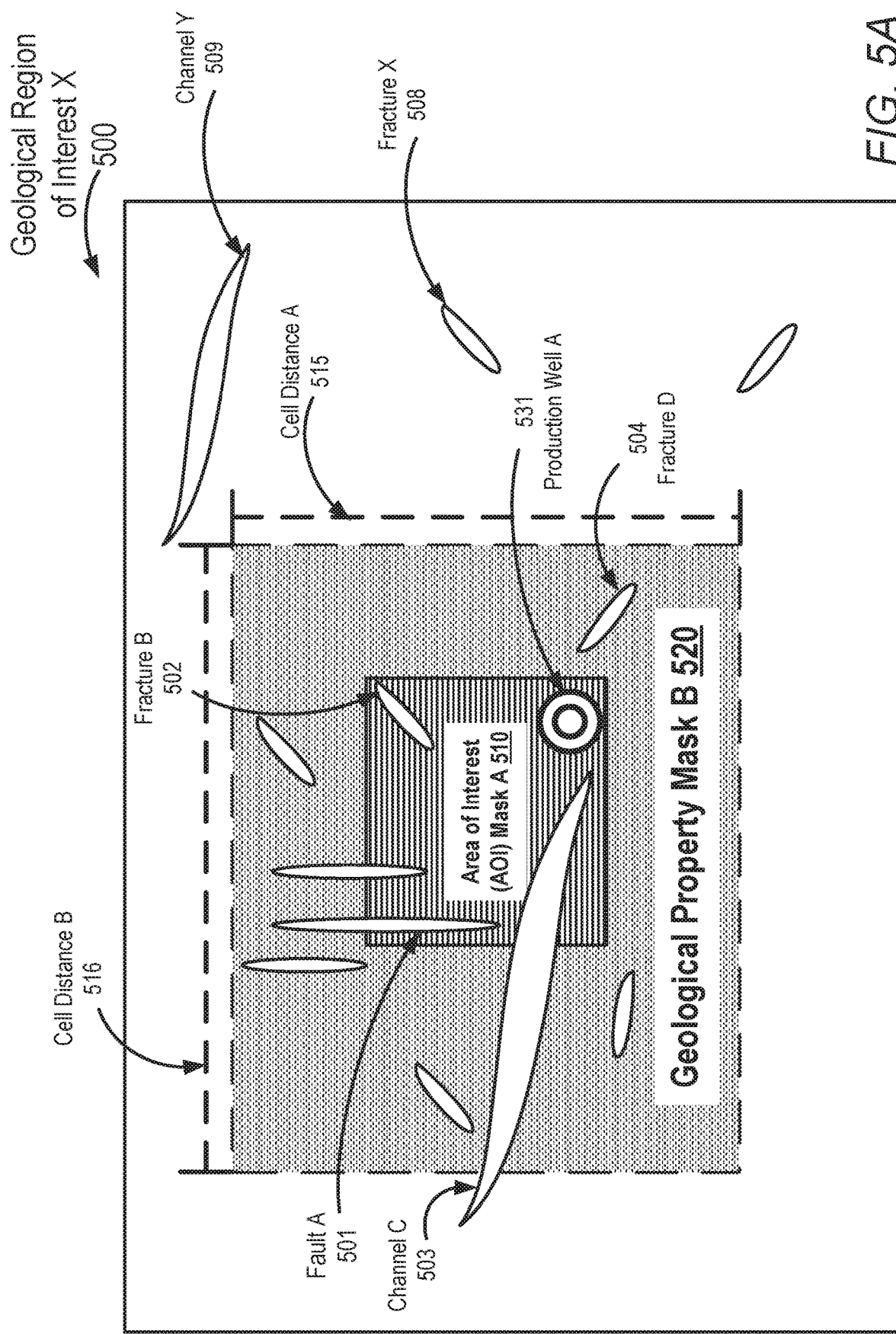

METHOD AND SYSTEM FOR RESERVOIR SIMULATIONS BASED ON AN AREA OF INTEREST

BACKGROUND

In a coarsened model, properties for various cells may be averaged in a process called upscaling. However, if not applied properly, upscaling may provide a solution in the coarsened model that may lose accuracy as details are lost in the averaging process, especially where coarsening is applied to highly influential grid cells. Thus, accurate simulations may require a coarsened model that reduces the computational time to a reasonable speed while also preserving relevant physical relationships in the underlying data.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, a selection of various user-defined coarsening parameters. The user-defined coarsening parameters include a predetermined fine-grid region in a geological region of interest and a predetermined cell distance. The method further includes determining, by the computer processor, an area of interest (AOI) mask for the geological region of interest based on the predetermined fine-grid region. The method further includes determining, by the computer processor, a geological property mask based on the user-defined coarsening parameters. The geological property mask corresponds to a predetermined geological feature within the predetermined cell distance from the AOI mask. The method further includes generating, by the computer processor, a coarsened grid model using grid model data and well data for the geological region of interest. The coarsened grid model includes a coarsened region based on the AOI mask and the geological property mask. The method further includes performing, by the computer processor, a reservoir simulation of the geological region of interest using the coarsened grid model.

In general, in one aspect, embodiments relate to a system that includes a wellhead coupled to a wellbore and a flow rate sensor coupled to the wellhead. The system further includes a reservoir simulator that includes a computer processor and is coupled to the flow rate sensor. The reservoir simulator obtains a selection of various user-defined coarsening parameters. The user-defined coarsening parameters include a predetermined fine-grid region in a geological region of interest and a predetermined cell distance. The reservoir simulator determines an area of interest (AOI) mask for the geological region of interest based on the predetermined fine-grid region. The reservoir simulator determines a geological property mask based on the user-defined coarsening parameters. The geological property mask corresponds to a predetermined geological feature within the predetermined cell distance from the AOI mask. The reservoir simulator generates a coarsened grid model using grid model data and well data for the geological region of interest. The coarsened grid model includes a coarsened region based on the AOI mask and the geological property mask. The reservoir simulator performs a reservoir simulation of the geological region of interest using the coarsened grid model.

In general, in one aspect, embodiments relate to a non-transitory computer readable medium storing instructions executable by a computer processor. The instructions obtain a selection of various user-defined coarsening parameters. The user-defined coarsening parameters include a predetermined fine-grid region in a geological region of interest and a predetermined cell distance. The instructions determine an area of interest (AOI) mask for the geological region of interest based on the predetermined fine-grid region. The instructions determine a geological property mask based on the user-defined coarsening parameters. The geological property mask corresponds to a predetermined geological feature within the predetermined cell distance from the AOI mask. The instructions generate a coarsened grid model using grid model data and well data for the geological region of interest. The coarsened grid model includes a coarsened region based on the AOI mask and the geological property mask. The instructions perform a reservoir simulation of the geological region of interest using the coarsened grid model.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 5A, 5B, 5C, and 5D show an example in accordance with one or more embodiments.

DETAILED DESCRIPTION

Figure 1:
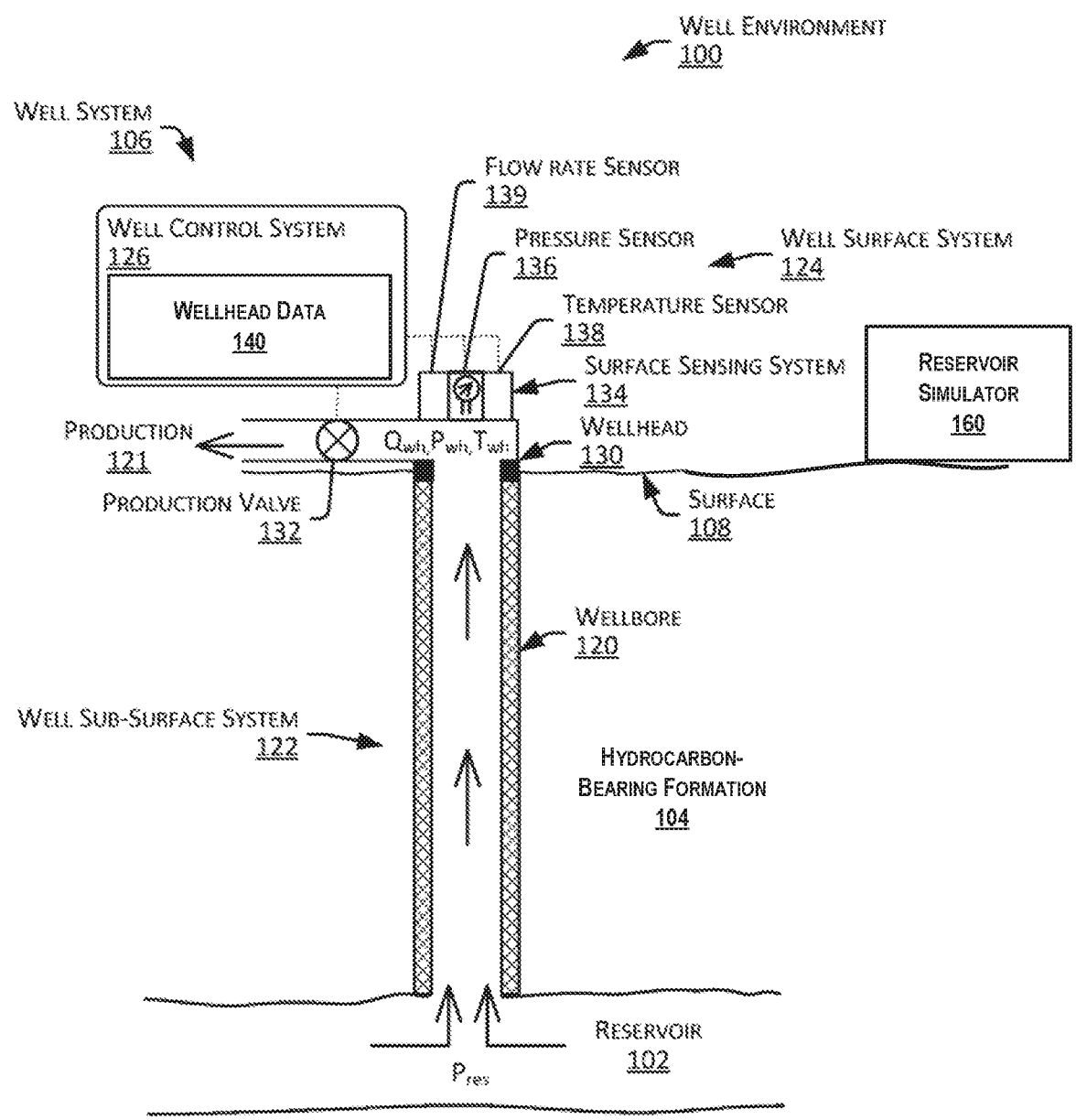
FIGS. 1, 2A, 2B, and 3 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using various user-defined coarsening parameters to coarsen a fine-grid model to increase computational performance of a reservoir simulation. In some embodiments, for example, different types of masks are generated for preserving resolution and/or determining coarsening within a resulting grid model. More specifically, an area of interest (AOI) mask may identify one or more regions selected by a user that should have their resolutions preserved in the resulting grid model. Likewise, this selected area of interest may provide an input in conjunction with other user-defined coarsening parameters to produce a geological property mask, a well mask, and/or a coarsening mask for specifying additional grid cell resolutions in a final coarsened grid model.

With respect to user-defined coarsening parameters, user-defined coarsening parameters may be selected by a user to identify various types of geological properties (e.g., faults or channels) and/or well properties (e.g., particular wells or types of wells, such as production or injection wells) that may have their cell resolutions protected or coarsened. Likewise, user-defined coarsening parameters may specify various dimensional inputs, such as cell distances, to assist a reservoir simulator in defining mask boundaries within a geological region of interest. As such, examples of user-defined coarsening parameters may include length and width values of a particular mask, radius values, center coordinates for a mask, relative values such as a mask's relationship to an area of interest, offsets, coarsening level values, and/or other attributes for defining coarsening and/or fine-grid regions within a coarsened grid model.

Furthermore, some embodiments of area-of-interest modelling may eliminate the difficulty in determining boundary conditions of a local grid model, e.g., as found in sector modeling. For example, a construction of a sector model may be time-consuming and cumbersome for various topological reasons (e.g. determining a particular sector of a grid that does not interfere with well predictions). By determining coarsening through application of different types of masks, a coarsened grid model may be generated without special boundary conditions between different wells and different sectors in the resulting grid model.

Turning to FIG. 1, FIG. 1 shows a schematic diagram in accordance with one or more embodiments. As shown in FIG. 1, FIG. 1 illustrates a well environment (100) that includes a hydrocarbon reservoir ("reservoir") (102) located in a subsurface hydrocarbon-bearing formation (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computer system (602) described below in FIG. 6 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (134). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (151) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (151) flowing through the well surface system (124), after it exits the wellbore (120). The flow rate sensor (139) may include hardware that senses a flow rate of production (121) ($Q_{wh}$) passing through the wellhead (130).

In some embodiments, the well system (106) includes a reservoir simulator (160). For example, the reservoir simulator (160) may include hardware and/or software with functionality for generating one or more reservoir models regarding the hydrocarbon-bearing formation (104) and/or performing one or more reservoir simulations. For example, the reservoir simulator (160) may store well logs and data regarding core samples for performing simulations. A reservoir simulator may further analyze the well log data, the core sample data, seismic data, and/or other types of data to generate and/or update the one or more reservoir models. While the reservoir simulator (160) is shown at a well site, embodiments are contemplated where reservoir simulators are located away from well sites. In some embodiments, the reservoir simulator (160) may include a computer system that is similar to the computer system (602) described below with regard to FIG. 6 and the accompanying description.

Figure 2A:
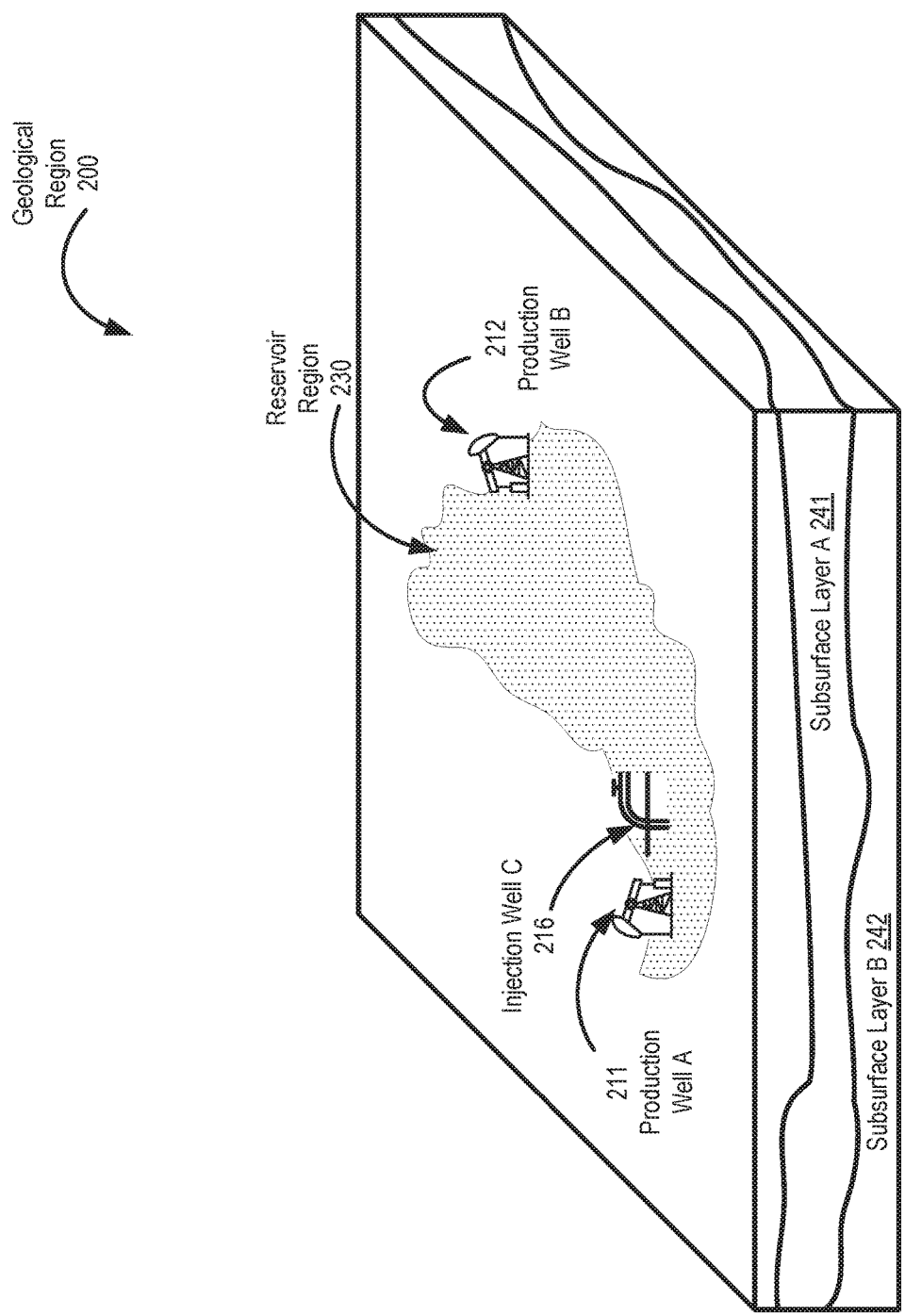

Turning to FIG. 2A, FIG. 2A shows a schematic diagram in accordance with one or more embodiments. As illustrated in FIG. 2A, FIG. 2A shows a geological region (200) that may include one or more reservoir regions (e.g., reservoir region (230)) with various production wells (e.g., production well A (211), production well (212)). For example, a production well may be similar to the well system (106) described above in FIG. 1 and the accompanying description. Likewise, a reservoir region may also include one or more injection wells (e.g., injection well C (216)) that include functionality for enhancing production by one or more neighboring production wells. As shown in FIG. 2A, wells may be disposed in the reservoir region (230) above various subsurface layers (e.g., subsurface layer A (241), subsurface layer B (242)), which may include hydrocarbon deposits. In particular, production data and/or injection data may exist for a particular well, where production data may include data that describes production or production operations at a well, such as wellhead data (140) described in FIG. 1 and the accompanying description.

Figure 2B:
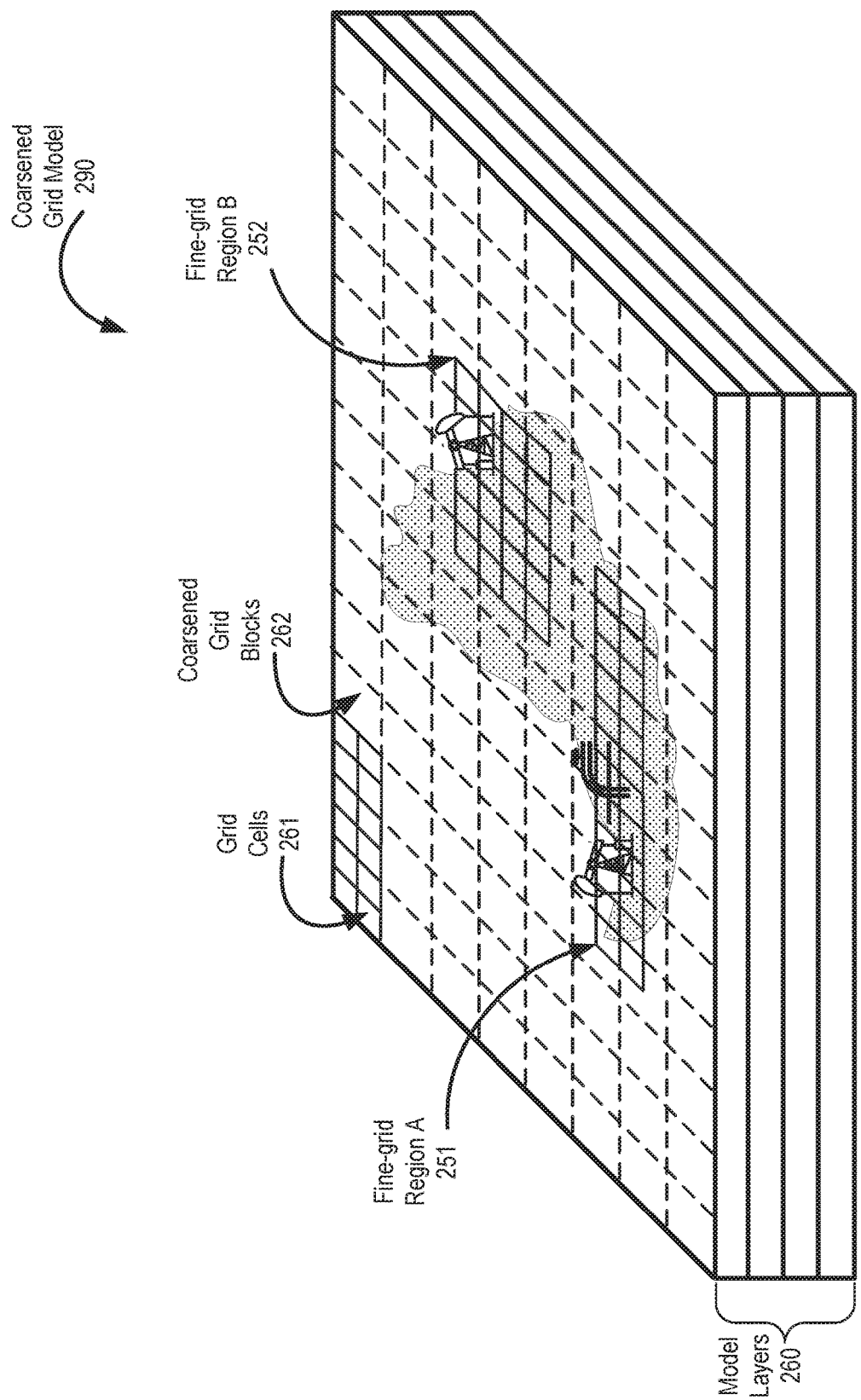

Turning to FIG. 2B, FIG. 2B shows a schematic diagram in accordance with one or more embodiments. As illustrated in FIG. 2B, FIG. 2B shows a coarsened grid model (290) that corresponds to the geological region (200) from FIG. 2A. More specifically, the coarsened grid model (290) includes grid cells (261) that may refer to an original cell of a grid model as well as coarsened grid blocks (262) that may refer to an amalgamation of original cells of the grid model. For example, a grid cell may be the case of a 1×1 block, where coarsened grid blocks may be of sizes 2×2, 4×4, 8×8, etc. Both the grid cells (261) and the coarsened grid blocks (262) may correspond to columns for multiple model layers (260) within the coarsened grid model (290).

Prior to performing a reservoir simulation, local grid refinement and coarsening (LGR) may be used to increase or decrease grid resolutions in various regions of a grid model. For example, various reservoir properties, e.g., permeability, porosity, or saturations, may correspond to discrete values that are associated with a particular grid cell or coarsened grid block. However, by using discrete values to represent a portion of a geological region, a discretization error may occur in a reservoir simulation. Thus, various fine-grid regions may reduce discretization errors as the numerical approximation of a finer grid is closer to the exact solution, however through a higher computational cost. As shown in FIG. 2B, for example, the coarsened grid model (290) may include various fine-grid regions (i.e., fine-grid region A (251), fine-grid region B (252)), that are surrounded by coarsened block regions. Likewise, the original grid model without any coarsening may be referred to as a fine-grid model.

In general, coarsening may be applied to cells that do not contribute to a total flow within a reservoir region because a slight change on such reservoir properties may not affect the output of a simulation. Accordingly, different levels of coarsening may be used on different regions of the same reservoir model. As such, a coarsening ratio may correspond to a measure of coarsening efficiency, which may be defined as a total number of cells in a coarsened reservoir model divided by the original number of cells in the original reservoir model.

Figure 3:
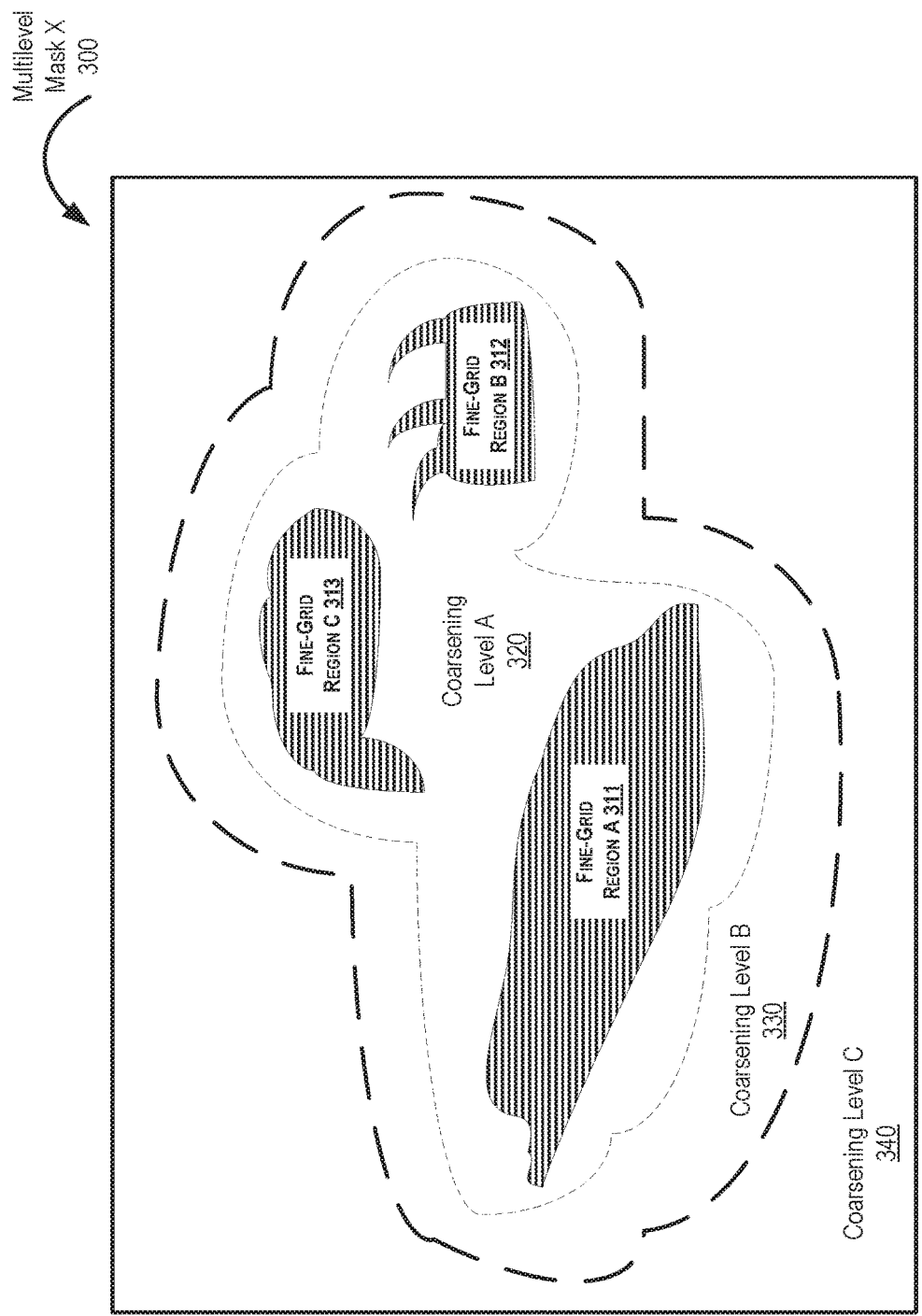

Turning to FIG. 3, FIG. 3 shows a schematic diagram in accordance with one or more embodiments. In FIG. 3, a multilevel mask (e.g., multilevel mask X (300)) describes various coarsening levels and/or refinement levels of a coarsened grid model. In some embodiments, a reservoir simulator uses a multilevel mask to label original cells in a grid model according to their respective coarsening or refinement levels for generating a particular coarsened grid model. In particular, these labels may correspond to various coarsening levels for original cells. In some embodiments, a multilevel mask is generated from multiple binary masks that specify areas where refinement or coarsening is desired in a grid model. A binary mask may be an image or other dataset that is defined according to '1' and '0's, or any other binary integer set. For example, a '1' in a binary mask may correspond to a coarsening level of 8×8 cells for the respective coarsened grid block, while a '0' identifies a cell or block that is left unchanged during the respective coarsening step.

Keeping with FIG. 3, the multilevel mask X (300) includes various coarsening levels (i.e., coarsening level A (320), coarsening level B (330), and coarsening level C (340)) and various fine-grid regions (i.e., fine-grid region A (311), fine-grid region B (312), and fine-grid region C (313)). Where the fine-grid regions correspond to original cells in a grid model, coarsening level A (320) corresponds to coarsened grid blocks of a 2×2 size. Likewise, coarsening level B (330) and coarsening level C (340) correspond to coarsened grid blocks of a 4×4 size and an 8×8 size, respectively. Thus, the property resolution (390) of the multilevel mask Z (300) ranges from a fine-grid resolution that matches original grid cells to a maximum coarsening level at coarsening level C (340).

In some embodiments, different types of masks are used to generate a coarsened grid model. For example, a mask may be defined by the following equation:

$$m_i \text{ for } i=1, N_x N_y N_z \qquad \text{Equation (1)}$$

where $N_x, N_y, N_z$ corresponds to x-coordinates, y-coordinates, and z-coordinates, respectively, within a grid model and the value of $m_i$ represents the target refinement for a resulting grid such that a value greater than '1' represents refinement for a particular cell and a value of '1' results in the cell preserving its current resolution. For a coarsening mask, a value less than '1' represents a target coarsening of $2^{-m_i}$. For example, a value of '-1' corresponds to a maximum of 2×2 coarsening, while a value of '-2' corresponds to a maximum of 4×4 coarsening and a value of '-3' corresponds to 8×8 coarsening. Examples of different types of masks include area of interest masks, well mask, geological property masks, and user-defined coarsening masks (also simply referred to as "coarsening masks"). These different types of masks will be described in further detail in FIGS. 4, 5A, 5B, 5C, and 5D, and the accompanying description below.

Figure 4:
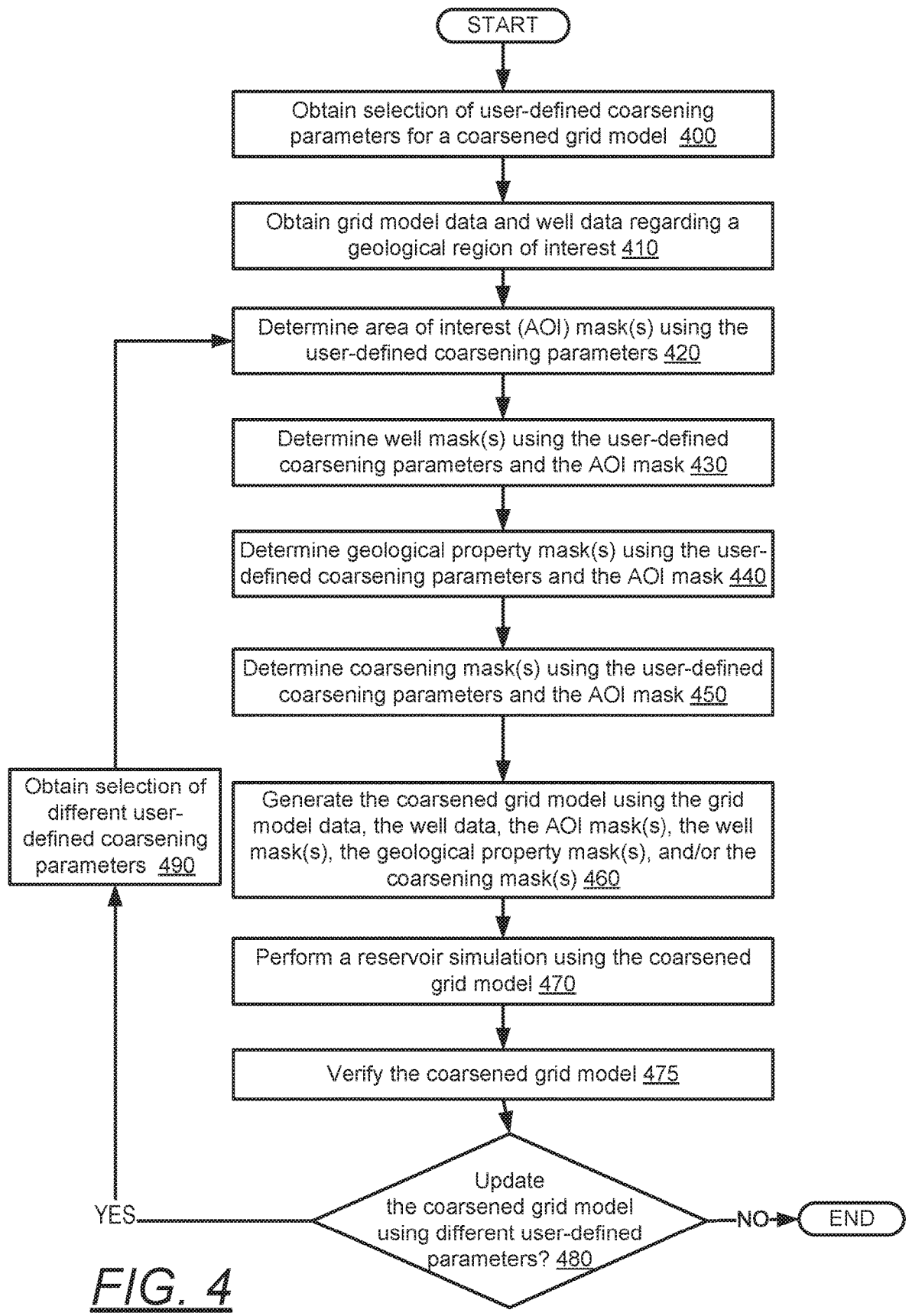
FIG. 4 shows a flowchart in accordance with one or more embodiments.

Turning to FIG. 4, FIG. 4 shows a flowchart in accordance with one or more embodiments. Specifically, FIG. 4 describes a general method for simulating a reservoir region of interest using a well assignment. One or more blocks in FIG. 4 may be performed by one or more components (e.g., reservoir simulator (160)) as described in FIGS. 1, 2B, and 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, a selection of various user-defined coarsening parameters are obtained for a coarsened grid model in accordance with one or more embodiments. In particular, a user may select within a graphical user interface on a user device one or more user-defined coarsening parameters for coarsening, refining, and/or preserving properties within a coarsened grid model. Once the user-defined coarsening parameters are selected, a reservoir simulator may obtain the user-defined coarsening parameters and automatically determine one or more masks for generating a coarsened grid model, e.g., an area of interest mask, a well mask, a coarsening mask, and/or a geological property mask. As such, the user-defined coarsening parameters may provide flexibility to vary the size and/or location of different masks with respect to different reservoir simulations.

In Block 410, grid model data and well data are obtained regarding a geological region of interest in accordance with one or more embodiments. For example, a reservoir simulator may access model data from a fine-grid model, where the model data includes various reservoir property values, such as oil saturation, water saturation, porosity, permeability, etc. Well data may correspond to various wellhead data described above in FIG. 1 as well as various well design parameters, e.g., type of wellbore, such as a vertical or horizontal well, and/or specific wellbore dimensions. Well data may also include historical production data or historical injection data, such as flow rate data, surface pressure data, etc., or simulated well data from one or more previous reservoir simulations. A geological region of interest may be a portion of a geological area or volume that includes one or more wells or formations of interest desired or selected for further analysis, e.g., for determining location of hydrocarbons or reservoir development purposes for a respective reservoir. As such, a geological region of interest may include one or more reservoir regions selected for running simulations. For example, the geological region of interest may be similar to geological region (200) or reservoir region (230) described above in FIG. 2A and the accompanying description.

In Block 420, one or more area of interest (AOI) masks are determined using various user-defined coarsening parameters in accordance with one or more embodiments. In some embodiments, for example, an AOI mask correspond to a chosen area within a geological region of interest that has its current resolution preserved for a full-field reservoir simulation. In other words, a reservoir simulator may areally coarsen various cells or blocks outside the AOI mask within a grid model while the area of interest is protected from coarsening. Thus, an AOI mask may identify one or more fine-grid regions that have their resolutions preserved within a coarsened grid model. An area of interest may defined, for example, using geographic coordinates or cell locations within a fine-grid model provided by user inputs, e.g., through a graphical user interface. In some embodiments, a reservoir simulator automatically determines a respective AOI mask in response to a user selecting one or more features desired to be simulated at a full-field resolution. Example features may include perforated cells of production wells in addition to geological features, such as one or more faults, one or more channels, one or more fractures, etc.

In some embodiments, an AOI mask is determined by selecting one or more wells being modeled in a reservoir simulation and one or more cell distances from the selected wells. Thus, these selected wells and the cell distances may be user-defined coarsening parameters that determine the AOI mask. Accordingly, the AOI mask may provide a degree of efficiency such that a complete full-field simulation does not need to be performed for an entire grid model. Likewise, the selected wells in the AOI mask may have aspects of the full field model available in a resulting reservoir simulation.

Keeping with Block 420, an AOI mask may be determined using an initial mask $m_i=0 \forall i$, where a user may specify a set of wells $S^{aoi}$. Thus, an AOI mask may be defined using the following equation:

$$\sum_{w \in S^{aoi}} \sum_{i \in w} m_i = 1 \qquad \text{Equation 2}$$

where $m_i$ corresponds to the initial mask and $S^{aoi}$ corresponds to the selected wells. For the AOI mask, various perforated cells of the selected wells in $S^{aoi}$ may be set to unity, thus indicating these perforated cells should not be coarsened in a coarsened grid model. The initial mask may be expanded by one or more user-defined coarsening parameters, e.g., cell distance $d^{aoi}$ which may represent the number of connected cells to the selected wells. In some embodiments, an expansion function $E_i(m,d)$ for adjusting an initial mask $m_i$ may be expressed by the following equation:

$$E_i(m, d) = \begin{cases} 1 & \text{if } \|m_i - m_j\| \leq d \ \forall \ j \\ 0 & \text{if } \|m_i - m_j\| < d \ \forall \ j \end{cases} \qquad \text{Equation 3}$$

where m corresponds to an input mask, $m_j$ corresponds to an expanded mask, d corresponds to a cell distance, and $\|m_i - m_j\|$ corresponds to a cell distance normalization between the initial and expanded masks.

In Block 430, one or more well masks are determined using various user-defined coarsening parameters and an AOI mask in accordance with one or more embodiments. In particular, a well mask may provide an image representation or a grid definition for a reservoir simulator that identifies one or more sets of well perforations for preservation. In other words, a well mask may provide a buffer zone around an AOI mask to insure various wells located outside an AOI mask experience minor or no coarsening in the coarsened grid model. As such, a reservoir simulator may use a well mask in a coarsening algorithm to determine which well perforations should not be coarsened.

Furthermore, injected fluids and well production in reservoir simulations may pass through various perforated cells that are connected to various wells. Since well data may be measured at wells (e.g., cell porosity values and permeability values), geological data may be conditioned with acquired well data. Thus, cell resolutions and property values at a respective well may have particular significance for a reservoir simulation. Accordingly, maintaining cell resolutions at wells within a particular cell distance of the area of interest mask may enhance the integrity of a coarsened grid model.

In some embodiments, a well mask is determined from one or more user-defined coarsening parameters, such as cell distances, provided by a user or automatically determined based on predetermined criteria by a reservoir simulator. For example, a cell distance may be a user-defined coarsening parameter, such as a radius measured from a center of an AOI mask. On the other hand, a cell distance may also refer to specific number of cells or blocks measured from an outer boundary of an AOI mask to an outer boundary of the well mask. For example, a well mask $m_i^{well}$ may be expressed in the following equation:

$$m_i^{well} = \begin{cases} 1 & \text{if } E_i(m^{aoi}, d^{well}) > 0 \text{ and } m_i^{perf} > 0 \\ 0 & \text{otherwize} \end{cases} \quad \text{Equation 4}$$

where $m^{aoi}$ is an AOI mask, $d^{well}$ is a cell distance from the AOI mask, $E_i$ is an expansion function using various user-defined coarsening parameters as inputs, and $m_i^{perf}$ is a mask of various perforated cells for wells in a coarsened grid model.

In Block 440, one or more geological property masks are determined using various user-defined coarsening parameters and an AOI mask in accordance with one or more embodiments. In particular, a geological property mask may identify various geological features within the geological region of interest, such as faults, fractures, channels, etc. that may affect a fluid or gas flow in a reservoir simulation. Where all cells in the area of interest may be protected, a geological property mask may only account for specific geological features located outside the area of interest. Likewise, a reservoir simulator may identify these geological features according to various cell properties, such as oil saturation, water saturation, gas saturation, porosity, permeability, total flux, fault activity, etc.

Keeping with Block 440, a reservoir simulator may determine a geological property mask using one or more cell distances among the user-defined coarsening parameters. Similar to a well mask, a geological property mask may provide a buffer zone around an AOI mask with respect to geological features or geological properties that are within a respective cell distance of the AOI mask. Thus, cells corresponding to a particular geological property may not be coarsened in a coarsened grid model if those cells also affect physical processes in the area of interest. As such, a geological property may correspond to discrete values, e.g., a fracture may be either exist or not exist in a region of a grid model. However, areas in the geological property mask may be coarsened in the final coarsened grid model not associated with a protected geological feature or geological property.

In some embodiments, a geological property mask $m_i^{prop}$ is expressed using the following equation:

$$m_i^{prop} = \begin{cases} 1 & \text{if } E_i(m^{aoi}, d^{prop}) > 0 \text{ and } p_i > 0 \\ 0 & \text{otherwize} \end{cases} \quad \text{Equation 5}$$

where $p_i$ corresponds to a predetermined geological property value, $d^{prop}$ corresponds to a cell distance from an AOI mask, $m^{aoi}$ corresponds to an AOI mask, and $E_i$ is an expansion function. As shown in Equation 5 above, for example, a cell outside an AOI mask may have its resolution preserved where the cell corresponds to a predetermined geological property and is within the specified cell distance. Otherwise, the cell may be coarsened.

In some embodiments, an example geological property mask corresponds to various fractures in a grid model. As fractures may include conduits of fluid, the fracture property mask may provide one or more buffer regions around an area of interest to protect various fractures from coarsening. As such, regions away from an area of interest may require high resolution for performing a reservoir simulation in order to accurately determine overall pressure and material movement into the area of interest. In a geological property mask, geological features may be preserved such that one or more fluid flows to and from an area of interest are not disrupted.

In some embodiments, one or more geological property values are determined among the user-defined coarsening parameters. In particular, a user may specify the $p_i$ value in Equation 5 for one or more geological features. For example, an engineer may have knowledge of various cell values and cells associated with geological features within a model dataset. Thus, if a historical match has been fully or partially achieved, various grid parameters may have been incorporated into the geological property $p_i$ values of a grid model. In some embodiments, for example, different geological properties for different geological features are used to produce multiple geological property masks (e.g., a reservoir simulator generates a fault property mask and a fracture property mask). In some embodiments, a reservoir simulator determines these different geological properties using geological modelling. Likewise, some embodiments may include no geological property masks if no geological features are desired for resolution preservation in the final coarsened grid model.

In Block 450, one or more coarsening masks are generated using one or more user-defined coarsening parameters and an AOI mask in accordance with one or more embodiments. In a coarsened grid model, a coarsening mask may control coarsening by specifying a particular coarsening level based on a cell distance from an AOI mask. For illustration purposes, various regions of a reservoir may include various fluid properties, like oil saturation, that may be undesirable to over-coarsen. To avoid over-coarsening, a coarsening mask may be determined for cell property $c_i$. In some embodiments, a coarsening mask $m_i^{cmask}$ may be expressed using the following equation:

$$m_i^{cmask} = \begin{cases} -1 & \text{if } E_i(m^{aoi}, d^{cmask}) > 0 \text{ and } c_i > 0 \\ 0 & \text{otherwize} \end{cases} \quad \text{Equation 6}$$

where $m^{aoi}$ is an AOI mask, $d^{cmask}$ is a cell distance from the AOI mask, $E_i$ is an expansion function using various user-defined coarsening parameters as inputs, and $c_i$ corresponds to a cell property that is selected to prevent over-coarsening in a similar manner as described above with geological property masks. In some embodiments, a coarsening mask may be a single level coarsening mask or a multilevel mask similar to the multilevel mask X (300) described above in FIG. 3 and the accompanying description.

In Block 460, a coarsened grid model is generated using grid model data, well data, one or more AOI masks, one or more well masks, one or more geological property masks, and/or one or more coarsening masks in accordance with one or more embodiments. For example, a reservoir simulator may use LGR statements, coarsening algorithms, etc. in order to generated a coarsened grid model. In some embodiments, model data is acquired directly from a well site, e.g., flow rate data from a flow rate sensor.

In Block 470, a reservoir simulation is performed using a coarsened grid model in accordance with one or more embodiments. For example, a reservoir simulator may use grid model data from the coarsened grid model to solve well equations and reservoir equations. By using a coarsened grid model, a reservoir simulator may reduce the total computation time for performing various types of simulations, such as history matching, predicting production rates at one or more wells, and/or determining the presence of hydrocarbon-producing formations for new wells. Likewise, various reservoir simulation applications may be performed, such as rankings, uncertainty analyses, sensitivity analyses, and/or well-by-well history matching. With respect to history matching, the objective may be to fit measured historical data to a reservoir model. In some embodiments, one or more reservoir simulations may optimize production for a well or group of wells, provide well design parameters for one or more wells, completion operations for one or more wells (e.g., using which down-hole devices).

In Block 475, a coarsened grid model is verified in accordance with one or more embodiments. In some embodiments, a reservoir simulator performs one or more validity analyses on a coarsened grid model to verify whether the model satisfies predetermined criterion. The type of verification may depend on the area of interest and/or the type of reservoir simulation. In some embodiments, for example, water cut values and simulated production rates of various wells in the area of interest are compared to full-field results from a fine-grid model. Likewise, depending on the time period (e.g., a long time window for simulations in contrast to a shorter time window), the size of the area of interest may be verified and increased/decreased if necessary to satisfy an accuracy threshold.

In Block 480, a determination is made whether to update a coarsened grid model using different user-defined coarsening parameters in accordance with one or more embodiments. In particular, a coarsened grid model may be adjusted, by a user or automatically by a reservoir simulator, by changing various user-defined coarsening parameters. For example, a reservoir simulator may change dimensions of the area of interest, various cell distances for the different types of masks, different coarsening levels, etc., and then proceed to regenerate a new coarsened grid model.

In some embodiments, a coarsened grid model may have one or more properties adjusted over targeted regions in order to increase a historical match between individual wells. Likewise, one or more user-defined coarsening parameters may be adjusted to fine-tune regional properties, such as pressure matches based on measured data from historical wells. In some embodiments, for example, a user determines based on one or more reservoir simulations whether the current coarsened grid model requires an update. Likewise, where the verification is performed automatically by a reservoir simulator, one or more user-defined coarsening parameters may be updated by the reservoir simulator to satisfy one or more validity analyses. Where a determination is made not to update the coarsened grid model, the process shown in FIG. 4 may end. Where a determination is made to update the coarsened grid model, the process shown in FIG. 4 may proceed to Block 490.

In some embodiments, various cell distance parameters are increased by a predetermined amount, e.g., to expand one or more respective buffer regions of one or more masks. Accordingly, a refinement ratio may be increased by changing the user-defined coarsening parameters. Once a set of masks and/or user-defined coarsening parameters have been determined for a particular area of interest, a user may learn from this experience in order adjust and initially set the parameters for other reservoir simulations and/or other grid models. Thus, by adjusting a few simple parameters, the changes may be propagated through multiple masks and into the resulting coarsened grid model. This may alleviate cumbersome work for the user designing a reservoir simulation. Likewise, if the area of interest is sufficient and the refinement ratio is high based on the verification, a user may even decrease the values of the user-defined coarsening parameters in order to decrease the refinement ration and perform simulations even faster.

In Block 490, a selection of different user-defined coarsening parameters is obtained in accordance with one or more embodiments. For example, a user may select different user-defined coarsening parameters (e.g., adjusted cell distances, adjusted area of interests, adjusted geological features) in order to produce an adjusted AOI mask, one or more adjusted well masks, and one or more adjusted geological property masks, one or more adjusted coarsening masks. The user-defined coarsening parameters may be obtained in a similar manner as described above in Block 400.

Turning to FIGS. 5A, 5B, 5C, and 5D, FIGS. 5A, 5B, 5C, and 5D provide an example of generating a coarsened grid model in accordance with one or more embodiments. The following example is for explanatory purposes only and not intended to limit the scope of the disclosed technology.

Turning to FIG. 5A, FIG. 5A illustrates an area of interest (AOI) mask A (510) that a user selects from a region within a geological region (500) of interest X. The selection is performed using various user-defined coarsening parameters (e.g., by the user specifying length and width values as well as center coordinates for the area of interest). As shown in FIG. 5A, the geological region (500) includes various geological features (e.g., fault A (501), fracture B (502), channel C (503), fracture D (504), fracture X (508), and channel Y (509)). With respect to the AOI mask A (510), the area of interest includes a production well A (531) and portions of various relevant geological features (i.e., fault A (501), fracture B (502), and channel C (503). However, fault A (501) and channel C (503) extend beyond the dimensions of the AOI mask A (510). Thus, a user also selects multiple cell distances (e.g., cell distance A (515), cell distance B (516)) to produce a geological property mask B (520). With the geological property mask B (520) in FIG. 5A, multiple additional geological (e.g., fracture D (504)) are further preserved to increase the accuracy of a reservoir simulation with production well A (531) located in the area of interest. Likewise, the geological property mask B (520) may be used to preserve a greater portion of channel C (503) and various fluid properties within the area of interest. In contrast, regions in the geological property mask B (520) without geological features may not have their resolution preserved and thus may be coarsened in the coarsened grid model.

Figure 5B:
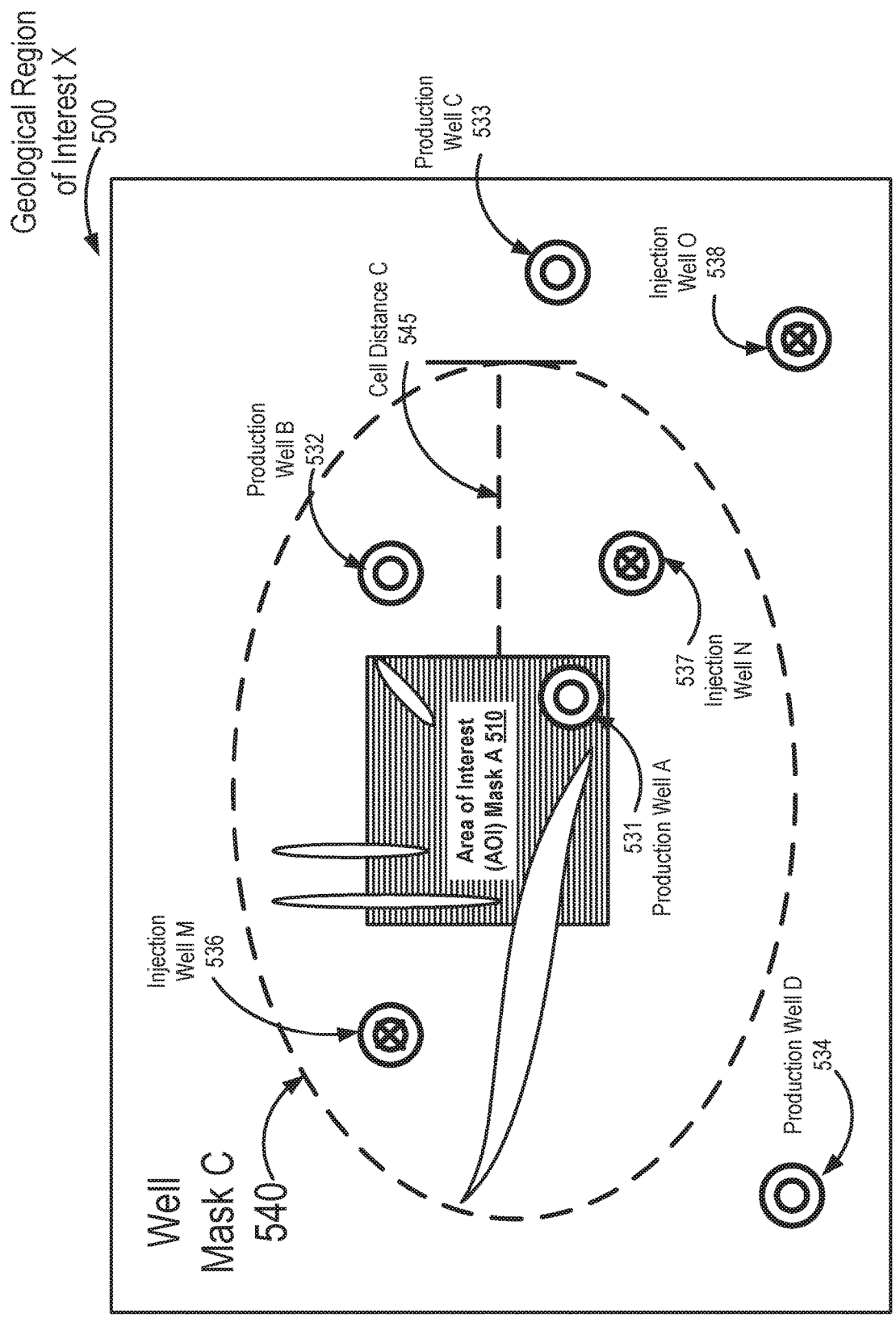

Turning to FIG. 5B, FIG. 5B illustrates a well mask C (540) that is applied to the geological region (500). More specifically, the well mask C (540) is determined from the area of interest as well as other user-defined coarsening parameters, such as user-defined elliptic radii (e.g., cell distance C (545)). As shown in FIG. 5B, the well mask C (540) provides a buffer region for various wells (i.e., production well B (532), injection well M (536), injection well N (537)) outside the AOI mask A (510) that may affect a reservoir simulation of the area of interest. As such, a reservoir simulator will preserve the resolution of the wells (532, 536, 537) in the final coarsened grid model and subsequent reservoir simulations. Where the well mask C (540) captures several wells (532, 536, 537), some wells (i.e., production well C (533), production well D (534), and injection well O (538)) are outside the buffer region and thus may be coarsened accordingly in the resulting grid model.

Figure 5C:
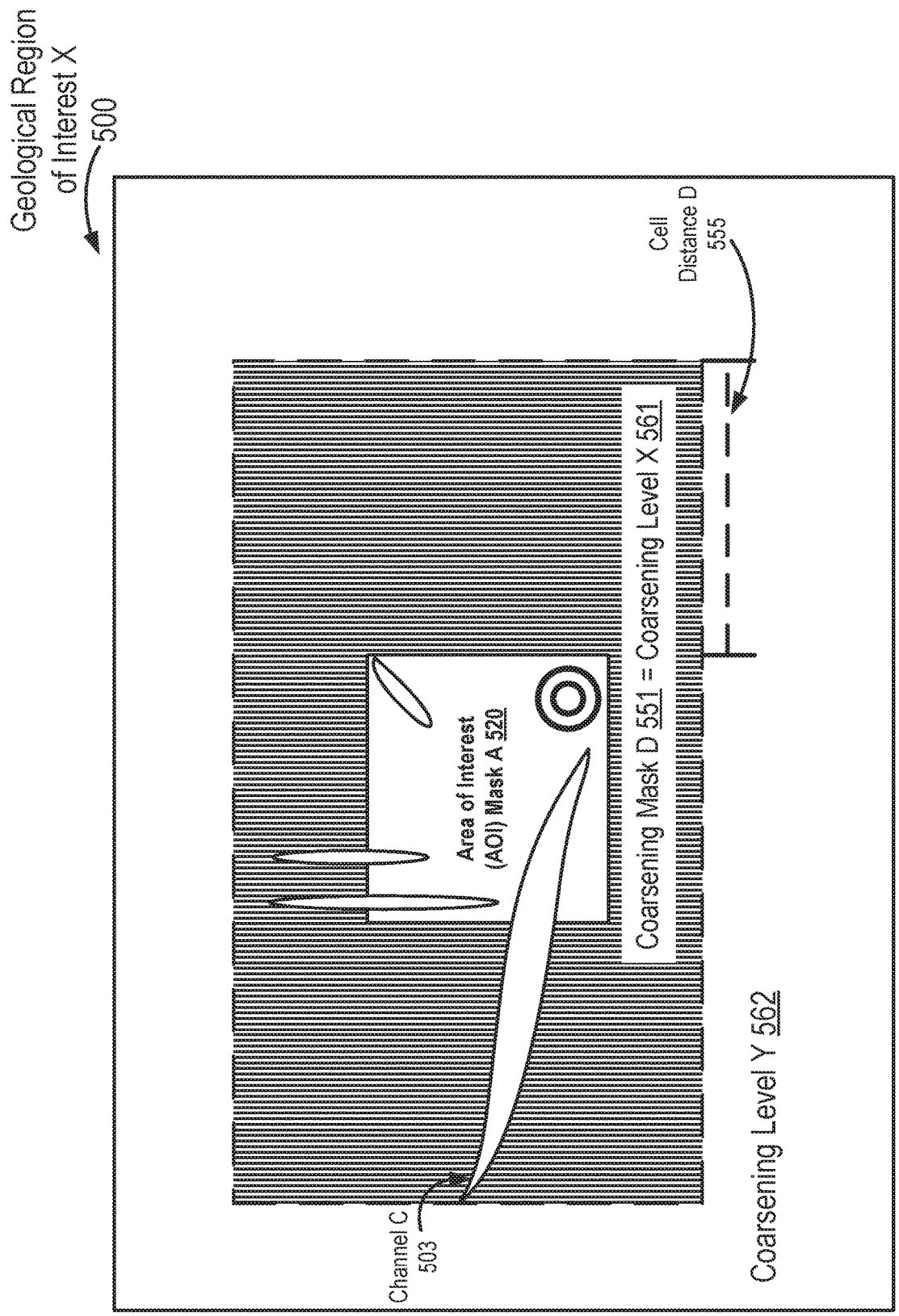

Turning to FIG. 5C, FIG. 5C illustrates a coarsening mask D (551) based on the area of interest and other user-defined coarsening parameters (e.g., cell distance D (555)). Where the AOI mask A (510) corresponds to a fine resolution region of the geological region (500), the coarsening mask D (551) corresponds to a coarsening level X (561) between the AOI mask A (510) and a maximum coarsening level, i.e., coarsening level Y (562). For example, the grid resolution of channel C (503) is preserved by the geological property mask B (520) in FIG. 5A, but some regions adjacent to channel C (503) are coarsened according to coarsening level X (561) by being located within the coarsening mask D (551).

Figure 5D:
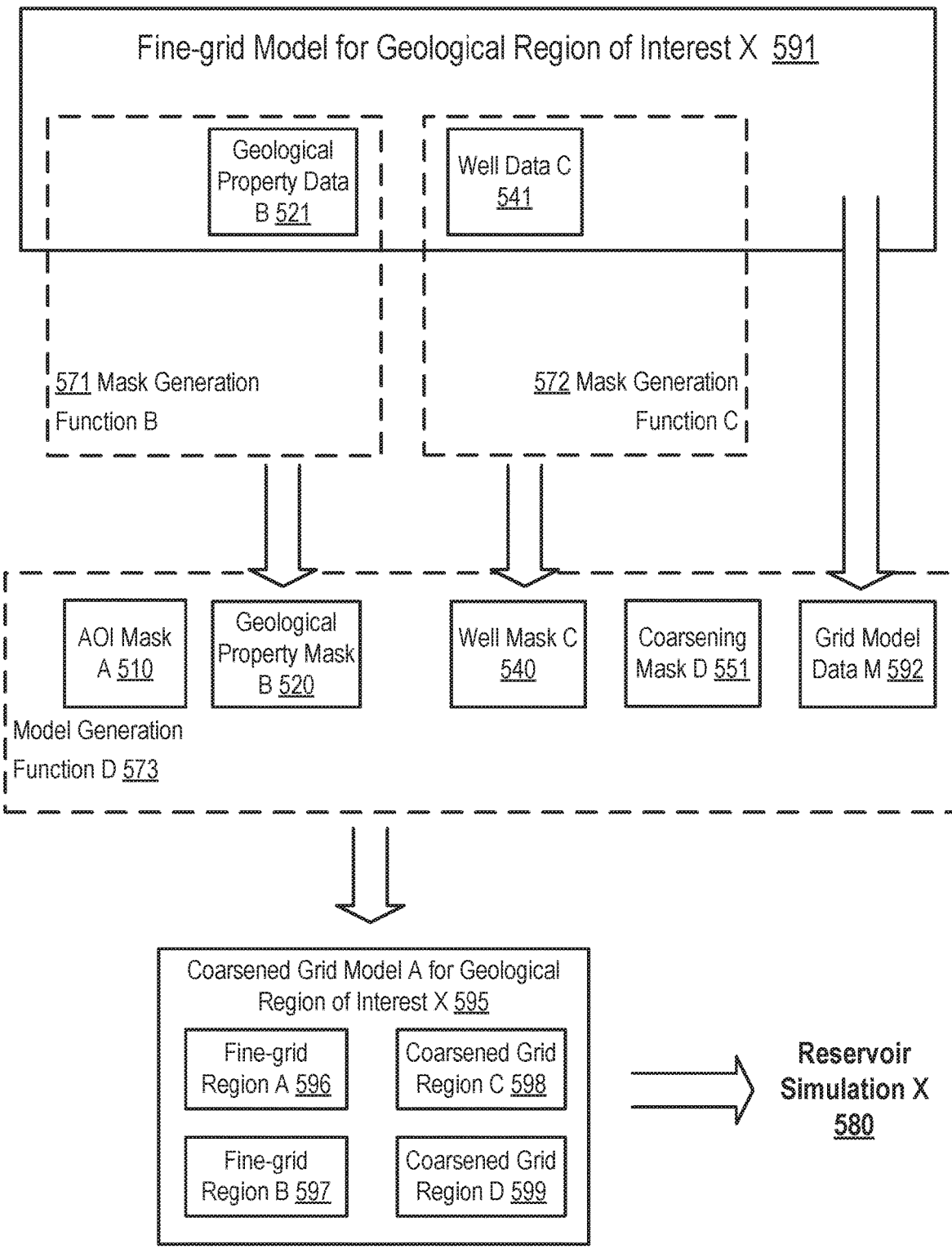

Turning to FIG. 5D, a reservoir simulator generates a coarsened grid model A (595) using a fine-grid model (591) for the geological region (500) and the masks described in FIGS. 5A, 5B, and 5C. As shown in FIG. 5D, a reservoir simulator uses a mask generation function B (571) to generate the geological property mask B (520) based on geological property data B (521), the AOI mask (510), and user-defined coarsening parameters described in FIG. 5A. Likewise, the reservoir simulations uses a mask generation function C (572) to generate the well mask C (540) based on well data C (541), the AOI mask (510), and user-defined coarsening parameters described in FIG. 5B. Similarly, the reservoir simulator also generates the AOI mask A (510) and the coarsening mask D (551). Using the masks (510, 520, 540, 551) and grid model data M (592) from the fine-grid model (591), the reservoir simulator generates the coarsened grid model A (595) using a model generation function D (573). As illustrated, the coarsened grid model A (595) includes various fine-grid regions (i.e., fine-grid region A (596), fine-grid region B (597)) and various coarsened grid regions (i.e., coarsened grid region C (598), coarsened grid region D (599)). Thus, the reservoir simulator uses the coarsened grid model A (595) to perform reservoir simulation X (580).

Figure 6:
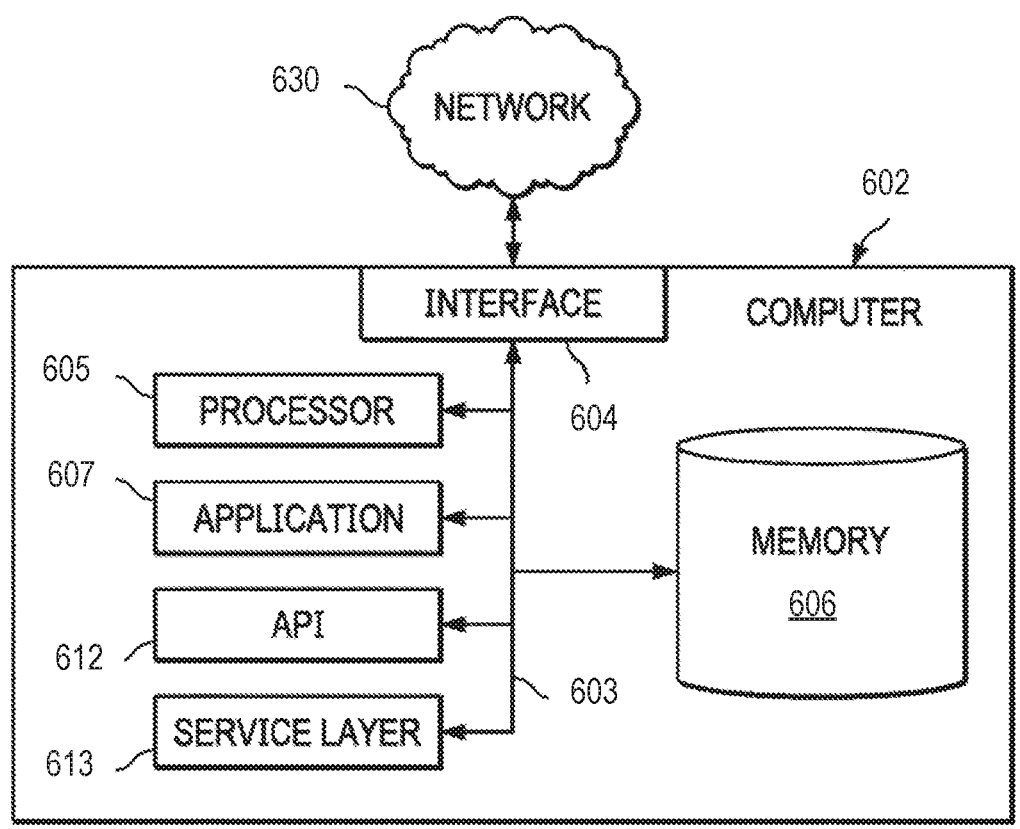
FIG. 6 shows a computer system in accordance with one or more embodiments.

Embodiments may be implemented on a computer system. FIG. 6 is a block diagram of a computer system (602) used to provide computational functionalities associated with described algorithms, methods, functions, processes, flows, and procedures as described in the instant disclosure, according to an implementation. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:
1. A method, comprising:
obtaining, by a computer processor, a first user selection comprising a first plurality of user-defined coarsening parameters and a plurality of selected geological features, wherein the first plurality of user-defined coarsening parameters comprise a predetermined fine-grid region in a geological region of interest and a first predetermined cell distance,
wherein the first user selection is based on one or more user inputs to a graphical user interface coupled to a reservoir simulator, and
wherein the plurality of selected geological features are selected from a group consisting of one or more faults, one or more channels, and one or more fractures;
determining, by the computer processor and automatically in response to obtaining the first user selection, an area of interest (AOI) mask for the geological region of interest based on the predetermined fine-grid region;
determining, by the computer processor, a plurality of geological property values for the plurality of selected geological features;
determining, by the computer processor, a geological property mask based on the first plurality of user-defined coarsening parameters and the plurality of geological property values, wherein the geological property mask corresponds to a plurality of grid cells within a reservoir grid model that are disposed within the first predetermined cell distance from the AOI mask;
generating, by the computer processor, a first coarsened grid model using grid model data and well data for the geological region of interest, wherein the first coarsened grid model comprises one or more coarsened regions based on the AOI mask and the geological property mask,
wherein the plurality of geological property values above a predetermined threshold correspond to at least one of the plurality of selected geological features within the geological property mask and to non-coarsened regions in the first coarsened grid model;
performing, by the computer processor, a reservoir simulation of the geological region of interest using the first coarsened grid model; and
determining, by the computer processor, a predicted production rate for a well in the geological region of interest based on the reservoir simulation.
2. The method of claim 1, further comprising:
determining a well mask for the geological region of interest based on the first plurality of user-defined coarsening parameters, wherein the well mask is determined based one or more wells being within a second predetermined cell distance from the AOI mask, and wherein the first coarsened grid model is generated using the well mask.

3. The method of claim 1, further comprising:

determining a coarsening mask for the geological region of interest based on the first plurality of user-defined coarsening parameters, wherein the coarsening mask is determined based on a second plurality of cells being within a second predetermined cell distance from a boundary of the AOI mask, wherein the first coarsened grid model comprises a first coarsening level, a second coarsening level that has greater coarsening than the first coarsening level, and a fine-grid resolution, and wherein the coarsening mask corresponds to the first coarsening level.

4. The method of claim 1, further comprising:

obtaining, from a user device, a plurality of geographic coordinates at define the predetermined fine-grid region within a fine-grid model, wherein the fine-grid model provides a full-field reservoir simulation of the geological region of interest, and wherein the AOI mask corresponds to a second plurality of cells in the first coarsened grid model that are not coarsened.

5. The method of claim 1, wherein the first user selection of the first plurality of user-defined coarsening parameters is obtained by a user device coupled to a reservoir simulator, and wherein the first user selection corresponds to one or more user inputs to a graphical user interface that is provided by the user device.

6. The method of claim 1, further comprising:

obtaining, in response to performing the reservoir simulation, a second selection of a second plurality of user-defined coarsening parameters, wherein the second plurality of user-defined coarsening parameters comprise an adjusted fine-grid region and an adjusted cell distance; and generating a second coarsened grid model using the grid model data and the well data, wherein second coarsened grid model comprises one or more adjusted coarsening regions based on the adjusted fine-grid region and the adjusted cell distance.

7. The method of claim 1, obtaining historical well data regarding a well within the geological region of interest, wherein the reservoir simulation determines simulated well data regard regarding the well, and wherein the historical well data and the simulated well data are compared by a reservoir simulator.

8. A system, comprising:

a wellhead coupled to a wellbore;

a flow rate sensor coupled to the wellhead; and a reservoir simulator comprising a computer processor and coupled to the flow rate sensor, wherein the reservoir simulator comprises functionality for:

obtaining a first user selection comprising a first plurality of user-defined coarsening parameters and a plurality of selected geological features, wherein the first plurality of user-defined coarsening parameters comprise a predetermined fine-grid region in a geological region of interest and a first predetermined cell distance, wherein the first user selection is based on one or more user inputs to a graphical user interface coupled to the reservoir simulator, and wherein the plurality of selected geological features are selected from a group consisting of one or more faults, one or more channels, and one or more fractures;

determining, automatically in response to obtaining the first user selection, an area of interest (AOI) mask for the geological region of interest based on the predetermined fine-grid region;

determining a plurality of geological property values for the plurality of selected geological features;

determining a geological property mask based on the first plurality of user-defined coarsening parameters and the plurality of geological property values, wherein the geological property mask corresponds to a plurality of grid cells within a reservoir grid model that are disposed within the first predetermined cell distance from the AOI mask;

generating a first coarsened grid model using flow rate data from the flow rate sensor and well data for the geological region of interest, wherein the first coarsened grid model comprises one or more coarsened regions based on the AOI mask and the geological property mask, wherein the plurality of geological property values above a predetermined threshold correspond to at least one of the plurality of selected geological features within the geological property mask and to non-coarsened regions in the first coarsened grid model;

performing a reservoir simulation of the geological region of interest using the first coarsened grid model; and determining a predicted production rate for a well in the geological region of interest based on the reservoir simulation.

9. The system of claim 8, wherein the reservoir simulator further comprises functionality for:

determining a well mask for the geological region of interest based on the first plurality of user-defined coarsening parameters, wherein the well mask is determined based one or more wells being within a second predetermined cell distance from the AOI mask, and wherein the first coarsened grid model is generated using the well mask.

10. The system of claim 8, wherein the reservoir simulator further comprises functionality for:

determining a coarsening mask for the geological region of interest based on the first plurality of user-defined coarsening parameters, wherein the coarsening mask is determined based on a second plurality of cells being within a second predetermined cell distance from a boundary of the AOI mask, wherein the first coarsened grid model comprises a first coarsening level, a second coarsening level that has greater coarsening than the first coarsening level, and a fine-grid resolution, and wherein the coarsening mask corresponds to the first coarsening level.

11. The system of claim 8, wherein the reservoir simulator further comprises functionality for:
obtaining, from a user device, a plurality of geographic coordinates that define the predetermined fine-grid region within a fine-grid model,
wherein the fine-grid model provides a full-field reservoir simulation of the geological region of interest, and
wherein the AOI mask corresponds to a second plurality of cells in the first coarsened grid model that are not coarsened.

12. The system of claim 8, wherein the reservoir simulator further comprises functionality for:
obtaining, in response to performing the reservoir simulation, a second selection of a second plurality of user-defined coarsening parameters, wherein the second plurality of user-defined coarsening parameters comprise an adjusted fine-grid region and an adjusted cell distance; and
generating a second coarsened grid model using grid model data and the well data,
wherein second coarsened grid model comprises one or more adjusted coarsening regions based on the adjusted fine-grid region and the adjusted cell distance.

13. A non-transitory computer readable medium storing instructions executable by a computer processor, the instructions being configured to perform a method comprising:
obtaining a first user selection comprising a first plurality of user-defined coarsening parameters and a plurality of selected geological features, wherein
the first plurality of user-defined coarsening parameters comprise a predetermined fine-grid region in a geological region of interest and a first predetermined cell distance,
wherein the first user selection is based on one or more user inputs to a graphical user interface coupled to a reservoir simulator, and
wherein the plurality of selected geological features are selected from a group consisting of one or more faults, one or more channels, and one or more fractures;
determining, automatically in response to obtaining the first user selection, an area of interest (AOI) mask for the geological region of interest based on the predetermined fine-grid region;
determining a plurality of geological property values for the plurality of selected geological features;
determining a geological property mask based on the first plurality of user-defined coarsening parameters and the plurality of geological property values, wherein
the geological property mask corresponds to a plurality of grid cells within a reservoir grid model that are disposed within the first predetermined cell distance from the AOI mask;
generating a first coarsened grid model using grid model data and well data for the geological region of interest, wherein the first coarsened grid model comprises one or more coarsened regions based on the AOI mask and the geological property mask,
wherein the plurality of geological property values above a predetermined threshold correspond to at least one of the plurality of selected geological features within the geological property mask and to non-coarsened regions in the first coarsened grid model;
performing a reservoir simulation of the geological region of interest using the first coarsened grid model; and
determining, by the computer processor, a predicted production rate for a well in the geological region of interest based on the reservoir simulation.

14. The non-transitory computer readable medium of claim 13, wherein the instructions further comprise functionality for:
determining a well mask for the geological region of interest based on the first plurality of user-defined coarsening parameters,
wherein the well mask is determined based one or more wells being within a second predetermined cell distance from the AOI mask, and
wherein the first coarsened grid model is generated using the well mask.

15. The non-transitory computer readable medium of claim 13, wherein the instructions further comprise functionality for:
determining a coarsening mask for the geological region of interest based on the first plurality of user-defined coarsening parameters,
wherein the coarsening mask is determined based on a second plurality of cells being within a second predetermined cell distance from a boundary of the AOI mask,
wherein the first coarsened grid model comprises a first coarsening level, a second coarsening level that has greater coarsening than the first coarsening level, and a fine-grid resolution, and
wherein the coarsening mask corresponds to the first coarsening level.

16. The non-transitory computer readable medium of claim 13, wherein the instructions further comprise functionality for:
obtaining a plurality of geographic coordinates that define the predetermined fine-grid region within a fine-grid model,
wherein the fine-grid model provides a full-field reservoir simulation of the geological region of interest, and
wherein the AOI mask corresponds to a second plurality of cells in the first coarsened grid model that are not coarsened.

17. The non-transitory computer readable medium of claim 13, wherein the instructions further comprise functionality for:
obtaining, in response to performing the reservoir simulation, a second selection of a second plurality of user-defined coarsening parameters, wherein the second plurality of user-defined coarsening parameters comprise an adjusted fine-grid region and an adjusted cell distance; and
generating a second coarsened grid model using the grid model data and the well data,
wherein second coarsened grid model comprises one or more adjusted coarsening regions based on the adjusted fine-grid region and the adjusted cell distance.

* * * * *